US012417254B2

(12) United States Patent
Berry

(10) Patent No.: US 12,417,254 B2
(45) Date of Patent: Sep. 16, 2025

(54) SYSTEMS AND METHODS FOR DYNAMICALLY CREATING HYPERLINKS ASSOCIATED WITH RELEVANT MULTIMEDIA CONTENT

(71) Applicant: Adeia Media Solutions Inc., San Jose, CA (US)

(72) Inventor: Matthew Berry, Creedmoor, NC (US)

(73) Assignee: Adeia Media Solutions Inc., San Jose, CA (US)

( * ) Notice: Subject to any disclaimer, the term of this patent is extended or adjusted under 35 U.S.C. 154(b) by 2 days.

(21) Appl. No.: 17/669,224

(22) Filed: Feb. 10, 2022

(65) Prior Publication Data

US 2022/0164401 A1 May 26, 2022

Related U.S. Application Data

(63) Continuation of application No. 15/600,222, filed on May 19, 2017, now Pat. No. 11,281,743, which is a
(Continued)

(51) Int. Cl.
*G06F 3/048* (2013.01)
*G06F 16/48* (2019.01)
(Continued)

(52) U.S. Cl.
CPC ............ *G06F 16/958* (2019.01); *G06F 16/48* (2019.01); *G06F 16/70* (2019.01); *G06F 16/955* (2019.01)

(58) Field of Classification Search
CPC ...... G06F 16/958; G06F 16/955; G06F 16/48; G06F 16/70
See application file for complete search history.

(56) References Cited

U.S. PATENT DOCUMENTS 5,267,351 A 11/1993 Reber et al.
5,537,528 A 7/1996 Takahashi et al.
(Continued)

OTHER PUBLICATIONS

A. Faaborg and H. Lieberman. A goal-oriented Web browser. In Proc. of SIGCHI, pp. 751-760, 2006 (Year: 2006).*
(Continued)

*Primary Examiner* — David Phantana-angkool
(74) *Attorney, Agent, or Firm* — HALEY GUILIANO LLP

(57) ABSTRACT

The present disclosure relates to systems and methods for dynamically creating hyperlinks associated with relevant multimedia content in a computer network. A hyperlink generation module receives an electronic text file from a server. The module searches the text file to identify keywords present in the file. Once the keywords have been identified, a database is queried to identify multimedia content that is related to the keywords. Generally, multimedia content is associated with metadata to enable efficient searching of the multimedia content. Typically, the multimedia content is contextually relevant to both the identified keywords and text file. One or more hyperlinks corresponding to the keywords are then generated and inserted into the text file. The hyperlinks provide pointers to the identified multimedia content. After insertion into the text file, the hyperlinks may be clicked by a user or viewer of the file to retrieve and display the identified multimedia content.

20 Claims, 7 Drawing Sheets

SCREEN SHOT OF EXEMPLARY ELECTRONIC TEXT FILE DISPLAYING POP-UP VIDEO

Related U.S. Application Data continuation of application No. 12/405,298, filed on Mar. 17, 2009, now Pat. No. 9,690,786.

(60) Provisional application No. 61/037,068, filed on Mar. 17, 2008.

(51) Int. Cl.
    *G06F 16/70*     (2019.01)
    *G06F 16/955*     (2019.01)
    *G06F 16/958*     (2019.01)

(56) References Cited

U.S. PATENT DOCUMENTS

| | | | |
|---|---|---|---|
| 5,630,121 | A | 5/1997 | Braden-Harder et al. |
| 5,650,941 | A | 7/1997 | Coelho et al. |
| 5,655,117 | A | 8/1997 | Goldberg et al. |
| 5,694,594 | A | 12/1997 | Chang |
| 5,815,830 | A | 9/1998 | Anthony |
| 5,832,495 | A | 11/1998 | Gustman |
| 5,903,892 | A | 5/1999 | Hoffert et al. |
| 5,956,729 | A | 9/1999 | Goetz et al. |
| 6,032,156 | A | 2/2000 | Marcus |
| 6,122,647 | A * | 9/2000 | Horowitz ............... G06F 16/954 707/999.005 |
| 6,134,380 | A | 10/2000 | Kushizaki |
| 6,154,601 | A | 11/2000 | Yaegashi et al. |
| 6,172,675 | B1 | 1/2001 | Ahmad et al. |
| 6,192,183 | B1 | 2/2001 | Taniguchi et al. |
| 6,195,458 | B1 | 2/2001 | Warnick et al. |
| 6,249,280 | B1 | 6/2001 | Garmon et al. |
| 6,285,361 | B1 | 9/2001 | Brewer et al. |
| 6,292,620 | B1 | 9/2001 | Ohmori et al. |
| 6,327,420 | B1 | 12/2001 | Furukawa |
| 6,330,004 | B1 | 12/2001 | Matsuzawa et al. |
| 6,895,407 | B2 | 5/2005 | Romer et al. |
| 7,003,719 | B1 | 2/2006 | Rosenoff et al. |
| 7,363,291 | B1 | 4/2008 | Page |
| 7,720,828 | B2 | 5/2010 | Bookstaff |
| 7,853,558 | B2 | 12/2010 | Brindley |
| 8,032,508 | B2 | 10/2011 | Martinez et al. |
| 8,078,632 | B1 * | 12/2011 | Stoutamire ............ G06F 16/783 707/999.005 |
| 8,131,665 | B1 * | 3/2012 | Wolfe ................... G06F 16/217 707/602 |
| 8,132,091 | B2 | 3/2012 | Nabutovsky |
| 8,135,617 | B1 * | 3/2012 | Agostino ............ G06Q 30/0241 705/1.1 |
| 8,312,022 | B2 | 11/2012 | Wilde et al. |
| 8,626,763 | B1 | 1/2014 | Wolfe |
| 8,682,722 | B1 * | 3/2014 | Des Jardins ......... H04N 21/812 705/7.11 |
| 9,690,786 | B2 | 6/2017 | Berry |
| 10,685,074 | B2 * | 6/2020 | Deets, Jr. ................ G06F 40/35 |
| 10,725,626 | B2 * | 7/2020 | Meixner ............... H04L 51/046 |
| 11,281,743 | B2 | 3/2022 | Berry |
| 2002/0089646 | A1 | 7/2002 | Chang |
| 2002/0108112 | A1 | 8/2002 | Wallace et al. |
| 2004/0019524 | A1 | 1/2004 | Marshall |
| 2004/0073531 | A1 | 4/2004 | Patterson |
| 2004/0111443 | A1 * | 6/2004 | Wong .................. G06F 11/1435 |
| 2004/0220909 | A1 | 11/2004 | Brown et al. |
| 2004/0267825 | A1 | 12/2004 | Novak et al. |
| 2005/0071736 | A1 | 3/2005 | Schneider et al. |
| 2005/0289113 | A1 | 12/2005 | Bookstaff |
| 2006/0253478 | A1 | 11/2006 | Graham et al. |
| 2007/0027844 | A1 | 2/2007 | Toub et al. |
| 2007/0028164 | A1 | 2/2007 | Kawanishi |
| 2007/0067267 | A1 * | 3/2007 | Ives ...................... G06F 16/951 |
| 2007/0180471 | A1 | 8/2007 | Unz |
| 2008/0010585 | A1 | 1/2008 | Schneider et al. |
| 2008/0027798 | A1 * | 1/2008 | Ramamurthi ...... G06Q 30/0277 705/14.54 |
| 2008/0046312 | A1 | 2/2008 | Shany et al. |
| 2008/0046507 | A1 * | 2/2008 | Westphal ............... G06F 16/958 709/217 |
| 2008/0109433 | A1 | 5/2008 | Rose |
| 2008/0114738 | A1 * | 5/2008 | Chao ................... G06F 16/9558 707/E17.112 |
| 2008/0140530 | A1 | 6/2008 | Van et al. |
| 2008/0168045 | A1 * | 7/2008 | Suponau ............... G06F 16/9038 707/999.005 |
| 2008/0239413 | A1 | 10/2008 | Vuong et al. |
| 2008/0282186 | A1 | 11/2008 | Basavaraju |
| 2008/0319845 | A1 * | 12/2008 | Adkins .................. G06Q 30/02 705/14.54 |
| 2009/0024936 | A1 | 1/2009 | Ragan |
| 2009/0094137 | A1 | 4/2009 | Toppenberg et al. |
| 2009/0100357 | A1 * | 4/2009 | Signorini ............ G06F 3/04812 715/781 |
| 2009/0235150 | A1 | 9/2009 | Berry |
| 2009/0235312 | A1 | 9/2009 | Morad et al. |
| 2009/0300476 | A1 | 12/2009 | Vogel et al. |
| 2010/0070448 | A1 * | 3/2010 | Omoigui ............... H01L 27/1463 706/55 |
| 2010/0083105 | A1 * | 4/2010 | Channabasavaiah ........................ G06F 16/9537 715/273 |
| 2010/0138271 | A1 * | 6/2010 | Henkin ............... G06Q 30/0256 705/14.54 |
| 2010/0268597 | A1 | 10/2010 | Bookstaff |
| 2011/0047152 | A1 | 2/2011 | Smith, III |
| 2012/0059776 | A1 | 3/2012 | Estes |
| 2017/0255626 | A1 | 9/2017 | Berry |
| 2019/0138655 | A1 * | 5/2019 | Deets, Jr. ................ G06Q 50/01 |
| 2024/0370512 | A1 * | 11/2024 | Senthil .................. G06F 16/958 |
| 2025/0014314 | A1 * | 1/2025 | Hamedi ............... G06V 10/761 |
| 2025/0104391 | A1 * | 3/2025 | Saraee .................. G06N 3/045 |

OTHER PUBLICATIONS

Bin He, et al., "Accessing The Deep Web", (Communications of the ACM), (May 2007/vol. 50, No. 5), (7 pages).

A. Bosch, A Zisserman, X. Munoz, "Scene Classification Using A Hybrid Generative/Discriminative Approach," IEEE Transactions on Pattern Analysis and Machine Intelligence, vol. 30, No. 4, Apr. 2008, pp. 1-37-40.

A. Bosch, X. Munoz, R Marti, "A Review: Which is the best way to organize/classify images by content?" Image Vision Computing 2006.

A. Torralba, A. Olivia, "Statistics of Natural Image Categories," Network: Computation in Neural Systems, Institute of Physics Publishing, 2003, vol. 14, pp. 391-412.

A. Vailaya, A. Jain, H.J. Zhang, "On Image Classification: City Images vs. Landscapes," Content-Based Access of Image and Video Libraries, 1998, Proceedings, IEEE Workshop, Jun. 21, 1998, pp. 1-23.

B.C. Russell, A. Torralba, K. Murphy, and W. Freeman, "LabelMe: A database and web-based tool for image annotation," International Journal of Computer Vision, vol. 77, Issue 1-3, May 2008, pp. 157-173.

C.C. Gotlieb, H.E. Kreyszig, "Texture descriptors based on co-occurrence matrices." Computer Vision, Graphics and Image Processing, Computer Vision, Graphics and Image Processing, 51: 1990, pp. 76-80.

D. Hoiem, A Efros, M. Hebert, "Geometric Context from a Single Image," International Conference of Computer Vision (ICCV), IEEE, Oct. 2005, pp. 1-8.

G. Heidemann, "Unsupervised Image Categorization," Image Vision Computing 23, 2005, pp. 861-876.

G. Mori, X. Ren, A. Efros, J. Malik, "Recovering Human Body Configurations: Combining Segmentation and Recognition," IEEE CS Conf. Computer Vision and Pattern Recognition, 2004.

HTML, XHTML, & CSS, Sixth Edition: Visual QuickStart Guide by Elizabeth Castro (Peachpit Press Aug. 16, 2006) (Castro).

J. Fox, R Castano, R Anderson, "Onboard Autonomous Rock Shape Analysis for Mars Rovers," IEEE Aerospace Conference Proceedings, Paper #276, Mar. 2002.

(56) References Cited

OTHER PUBLICATIONS

J. Kivinen, E. Sudderth, M. Jordan, "Learning Multiscale Representations of Natural Scenes Using Dirichlet Processes," IEEE 11th International Conference on Computer Vision, 2007.

J. Li, J. Wang, "Automatic Linguistic Indexing of Pictures by a Statistical Modeling Approach," IEEE Transactions on Pattern Analysis and Machine Intelligence, vol. 25, No. 9, Sep. 2003.

J. Luo, A Savakis, "Indoor vs Outdoor Classification of Consumer Photographs Using Low-Level and Semantic Features," Image Processing, 2001 International Conference, Oct. 2001, vol. 2, 745-748.

J. Shotton, M. Johnson, R. Cipolla, "Semantic Texton Forests for Image Categorization and Segmentation," IEEE Computer Vision and Pattern Recognition, 2008, pp. 1-8.

J. Vogel, B. Schiele, "Natural Scene Retrieval based on Semantic Modeling Step," International Conference on Image and Video Retrieval CIVR 2004, Jul. 2004, Dublin, Ireland.

L. Fei-Fei, P. Perona, "A Bayesian Hierarchical Model for Learning Natural Scene Categories," Proceedings of the 2005 IEEE Computer Society Conference on Computer Vision and Pattern Recognition, IEEE Computer Society, 2005, pp. 524-531.

L. Lepisto, I. Kunttu, J. Autio, A. Visa, "Comparison of Some Content-Based Image Retrieval Systems with Rock Texture Images,"Proceedings of 10th Finnish AI Conference, Dec. 2002.

M. Boutell, J. Luo, C. Brown, "Factor-graphs for Region-base Whole-scene Classification," Proceedings of the 2006 Con!. on Computer Vision and Pattern Recognition Workshop, IEEE Computer Society, 2006.

M. Boutell, J. Luo, R.T. Gray, "Sunset Scene Classification Using Simulated Image Recomposition," Proceedings of the 2003 Int'l Conf. on Multimedia and Expo, IEEE Computer Society, 2003, pp. 37-40.

M. Israel, E. Van Den Broek, P. Van Der Putten, "Automating the Construction of Scene Classifiers for Content-Based Video Retrieval," MDM/DKK'04, Aug. 22, 2004, Seattle, WA, USA.

M. Partio, B. Cramariuc, M. Gabbouj, A. Visa, "Rock Texture Retrieval Using Gray Level Co-Occurrence Matrix," 5th Nordic Signal Processing Symposium, Oct. 2002.

M. Peura, J_Iivarinen, "Efficiency of Simple Shape Descriptors," Proceedings of the Third International Workshop on Visual Form, Capri, Italy, May 1997, pp. 1-9.

M. Varma, A. Zisserman, "A Statistical Approach to Texture Classification from Single Images," Kluwer Academic Publishers, 2004, Netherlands.

Microsoft Smart Tags: Support Ignore Condemn Them by Gareth Hughes (ACM 2002).

N. Serrano, A. Savakis, J Luo, "A Computationally Efficient Approach to Indoor/Outdoor Scene Classification," Proceedings of 16th International Conference on Pattern Recognition, 2002, vol. 4, p. 40146.

P. Felzenszwalb, D. Huttenlocher, "Efficient Graph-Based Image Segmentation," International Journal of Computer Vision, Sep. 2004, vol. 59, Issue 2, Kluwer Academic Publishers, pp. 167-181.

P. Quelhas, J. Odobez, "Natural Scene Image Modeling Using Color and Texture Visterms," Lecture Notes in Computer Science, Springer Berlin/Heidelberg, vol. 4017, Jun. 30, 2006, pp. 411-421.

S. Lazebnik, C. Schmid, J. Ponce, "Beyond Bags of Features: Spatial Pyramid Matching for Recognizing Natural Scene Categories," Computer Vision and Pattern Recognition, 2006 IEEE Computer Science Society Conference, vol. 2, 2006, pp. 2169-2178.

Sen-Ching S. Cheung and Avideh Zakhor, Efficient Video Similarity Measurement with Video Signature, Department of Electrical Engineering and Computer Sciences, University of California, Berkeley, CA, 94720, USA, pp. 1-33.

T. Leung, J. Malik, "Representing and Recognizing the Visual Appearance of Materials Using Three Dimensional Textons," International Journal of Computer Vision, 43, 2001, pp. 29-44.

V. Milkli, H. Kaerdi, P. Kulu, M. Besterci, "Characterization of Powder Particle Morphology," Proceedings of Estonian Acad. of Sci. Eng. vol. 7, 2001, pp. 22-34.

X. Hua, X. Chen and H. Zhang, "Robust Video Signature Based on Ordinal Measure," Microsoft Research Asia, Beijing 100080, China, pp. 1-4.

Y. Chen, J.Z. Wang, "Image Categorization by Learning and Reasoning with Regions," Journal of Machine Learning Research, 2004, vol. 5, pp. 913-939.

Z. Rasheed, M. Shah, "Scene Detection in Hollywood Movies and TV Shows," IEEE Computer Society Conference on Computer Vision and Pattern Recognition, vol. 2, Feb. 27, 2003, pp. 1-8.

\* cited by examiner

HYPERLINK GENERATION SYSTEM

HYPERLINK GENERATION MODULE PROCESS

HYPERLINK CODE CREATION PROCESS

SCREEN SHOT OF EXEMPLARY ELECTRONIC TEXT FILE

SCREEN SHOT OF EXEMPLARY ELECTRONIC TEXT FILE WITH HYPERLINKS

SCREEN SHOT OF EXEMPLARY ELECTRONIC TEXT FILE
DISPLAYING POP-UP VIDEO

SCREEN SHOT OF EXEMPLARY HYPERLINK LISTING

SYSTEMS AND METHODS FOR DYNAMICALLY CREATING HYPERLINKS ASSOCIATED WITH RELEVANT MULTIMEDIA CONTENT

CROSS REFERENCE TO RELATED APPLICATION

This application is a continuation of U.S. patent application Ser. No. 15/600,222, filed on May 19, 2017, which is a continuation of U.S. patent application Ser. No. 12/405,298, filed on Mar. 17, 2009, now U.S. Pat. No. 9,690,786, and claims the benefit under 35 U.S.C. § 119 (e) of U.S. Provisional Patent Application No. 61/037,068, filed Mar. 17, 2008, entitled "Systems and Methods for Dynamically Creating Hyperlinks Associated with Relevant Multimedia Content," which is are hereby incorporated by reference herein in their entireties.

TECHNICAL FIELD

The present systems and methods relate generally to electronic text files, Internet websites, and multimedia content, and particularly to systems and methods for automatically generating hyperlinks associated with multimedia content within electronic text files.

BACKGROUND

The Internet has made various forms of content available to users across the world. For example, Internet users access websites to view articles, research particular topics of interest, watch videos, etc. Content providers and publishers (e.g. website providers) use the Internet to display articles or news stories, describe offered services, present advertising, and perform a host of other activities. Often, websites include one or more "hyperlinks" that, when clicked via a mouse or cursor, direct an Internet user to additional content or information. As used herein, a "hyperlink" refers to a directly followable reference (i.e. a relation between objects in which one object designates by linking to another object) for use within an electronic text file or hypertext document. As is customary and understood in the art, hyperlinks are typically highlighted or presented in a color different from their surrounding text to indicate to an Internet user that the hyperlink may be accessed for additional content.

Often, hyperlinks are used for linking to and/or displaying videos, images, other websites, articles, advertisements, etc. In some circumstances, content providers use hyperlinks and their associated content to retain Internet users at the providers' sites for longer periods of time. It is generally assumed that the longer a user remains at a website, the more advertising he or she will be exposed to, or the more interested he or she may become in the website content (and thus become a repeat viewer, subscribe to a membership, etc.), and the more popular and profitable the website will become. Accordingly, content publishers often create hyperlinks to videos, images, related articles, etc., in the hopes of keeping users at the publishers' sites for longer periods of time. For example, many content publishers assume that if an Internet user is reading an article on a website, the user would most likely be interested in a video or additional article related to the content of the initial article. Thus, it is highly beneficial to the publisher to present hyperlinks to videos or other content that are contextually relevant to the initial website content in the hopes that the user will interact with the hyperlinked content, and will thereby continue viewing the particular website (and its associated content and advertisements) instead of navigating to another site.

Traditionally, website developers or programmers manually create each hyperlink in an electronic text file by hard-coding the link into the text file. With the advent of electronic news media and the virtually real-time availability of Internet content, it is extremely difficult for programmers to keep up. For example, assuming a particular Internet publisher of new stories desires to link to relevant videos within each of its published news stories, website developers must continue to manually create hyperlinks to related videos each time all additional story is published on the associated website. In a situation in which the content provider publishes new content rapidly and continuously, it can become virtually impossible for programmers to generate hyperlinks for each new content item, much less create links to content that is contextually relevant to the original content item. Also, this manual hyperlink creation can be cumbersome, tedious, inefficient, and time-consuming, as well as a drain on monetary resources that could be used for other business needs within a network environment.

In addition to being time-consuming and inefficient, because hyperlinks are manually created to point to videos or other content chosen by a programmer or website operator, the selected videos are often not relevant or germane to the article of interest. For example, as time passes, videos may become stale or forgotten, and thus highly relevant videos are not associated with a particular article, either because they are old and a programmer has forgotten them, or because the programmer is simply unaware of their existence. Considering the vast amount of content available today over the web, it is infeasible for a programmer to be able to make intelligent decisions regarding linking of content to each new published content item, especially considering the time constraints placed on the programmer. Thus, an Internet user clicking a hyperlink may be limited to viewing content, such as a video or list of videos, that is only marginally related, or not related at all, to the original website content.

Additionally, many hyperlinks are programmed to return a further list of hyperlinks, wherein the hyperlinks in the list as each associated with additional content, videos, websites, etc. Typically, such a list is unranked and unorganized, and is often presented with no discernable structure or organization. For example, the list may simply comprise a catalog of a given website's most current videos, regardless of content. Or, a list may include any and all videos stored on a website's database, with no selection or organization. In these circumstances, a user must tediously search through the plurality of videos or other content to find the content that is most relevant to the article or electronic text file the user is viewing on the web page. This tedious searching is not only annoying, but time-consuming, and there is no assurance that the user will discover videos that are relevant to the original article, or with which the user would have an interest.

For these and many other reasons, there is a continuing need for a system or method that dynamically generates or creates hyperlinks within an electronic text file, and associates those hyperlinks with content that is contextually relevant to the electronic text file. There is a further need for a system or method that ranks lists of hyperlinks associated with an electronic text file according to the relevance of the linked content to the text file.

BRIEF SUMMARY OF THE DISCLOSURE

Briefly described, and according to one embodiment, the present disclosure is directed to a system for creating hyperlinks within electronic text files that link to multimedia content, wherein the multimedia content is contextually related to the electronic text files. The system comprises a server for hosting and displaying electronic text files to users, a database for storing the electronic text files and multimedia content, and a hyperlink generation module that performs the steps of generating and inserting hyperlinks into an electronic text file. Specifically, the described embodiment of the hyperlink generation module receives an electronic text file from the server, scans the electronic text file to identify one or more keywords in the electronic text file, queries the database as a function of the one or more identified keywords to identify multimedia content related to the identified keywords based on metadata associated with the multimedia content, generates a hyperlink for each of the one or more identified keywords, wherein each generated hyperlink includes a pointer to the identified multimedia content related to the respective keyword, and inserts the one or more generated hyperlinks into the electronic text file for subsequent use.

According to one aspect, the step performed by the hyperlink generation module of querying the database further comprises the steps of retrieving the multimedia content, extracting the metadata associated with the multimedia content, and comparing the extracted metadata to the one or more identified keywords to identify specific multimedia content related to the one or more identified keywords.

According to another aspect, the one or more keywords are selected from a predefined list, dynamically generated, or identified via some combination of both.

According to a further aspect, the electronic text files comprise file types selected from the group comprising: HyperText Markup Language (HTML) files, Extensible HyperText Markup Language (XHTML) files, and Extensible Markup Language (XML) files.

According to an additional aspect, the multimedia content comprises one or more video files or audio files.

According to yet another aspect, the pointer to the identified multimedia content includes a storage address in the database for the identified multimedia content.

According to another embodiment, the present disclosure is directed to a method, in a computer network, for dynamically creating one or more hyperlinks within an electronic text file. The method comprises the steps of receiving an electronic text file, searching the electronic text file to identify one or more keywords in the electronic text file, querying a multimedia content database index based on the one or more identified keywords to identify multimedia content related to the identified keywords as a function of metadata associated with the multimedia content, generating a hyperlink for each of the one or more identified keywords, wherein each generated hyperlink includes a pointer to the identified multimedia content related to the respective keyword for subsequent retrieval of the multimedia content, and inserting the one or more generated hyperlinks into the electronic text file for display to a viewer of the electronic text file. When activated or "clicked" by a viewer, the one or more inserted hyperlinks are used to retrieve and display the identified multimedia content to the viewer of the electronic text file within the computer network.

According to one aspect, the step of querying the multimedia content database index further comprises the steps of retrieving the multimedia content, extracting the metadata associated with the multimedia content, and comparing the extracted metadata to the one or more identified keywords to identify specific multimedia content related to the one or more identified keywords. According to another aspect, the identified multimedia content is contextually related to the electronic text file.

According to a further aspect, the one or more keywords are selected from a predefined list, dynamically generated, or identified via some combination of both.

According to an additional aspect, the electronic text file comprises a file type selected from the group comprising: a HyperText Markup Language (HTML) file, an Extensible HyperText Markup Language (XHTML) file, and an Extensible Markup Language (XML) file.

According to yet another aspect, the multimedia content comprises one or more video files or audio files.

According to still another aspect, the pointer to the identified multimedia content includes a storage address within the computer network for the identified multimedia content.

According to a further embodiment, the present disclosure is directed to a method, in a computer network, for automatically creating one or more hyperlinks within an electronic text file for subsequent display to one or more viewers, wherein each of the one or more hyperlinks is linked to one or more videos that are contextually relevant to content of the electronic text file. The method comprises the steps of receiving the electronic text file from a web server, scanning the electronic text file to identify one or more keywords in the electronic text file, retrieving a plurality of videos from a video database index, wherein each video in the plurality of videos is associated with one or more metadata identifiers, and extracting the one or more metadata identifiers from each video in the plurality of videos. Once extracted, the metadata identifiers are compared with the one or more identified keywords to identify one or more matches between the identifiers and keywords. For each identified keyword, the method further comprises the steps of retrieving a storage address in a video database for each video associated with the one or more extracted metadata identifiers matched to the respective keyword, associating the storage address for each video with the keyword to generate a hyperlink code for the keyword, and inserting the generated hyperlink code into the electronic text file. After all hyperlink codes have been inserted, the electronic text file is displayed to one or more viewers, and the inserted hyperlink codes are utilized to retrieve and display the one or more matched videos to the one or more viewers of the text file.

According to one aspect, the one or more keywords are selected from a predefined list, dynamically generated, or identified via some combination of both methods.

According to another aspect, the electronic text file comprises a file type selected from the group comprising: a HyperText Markup Language (HTML) file, an Extensible HyperText Markup Language (XHTML) file, and an Extensible Markup Language (XML) file.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF PREFERRED EMBODIMENTS

Figure 1:
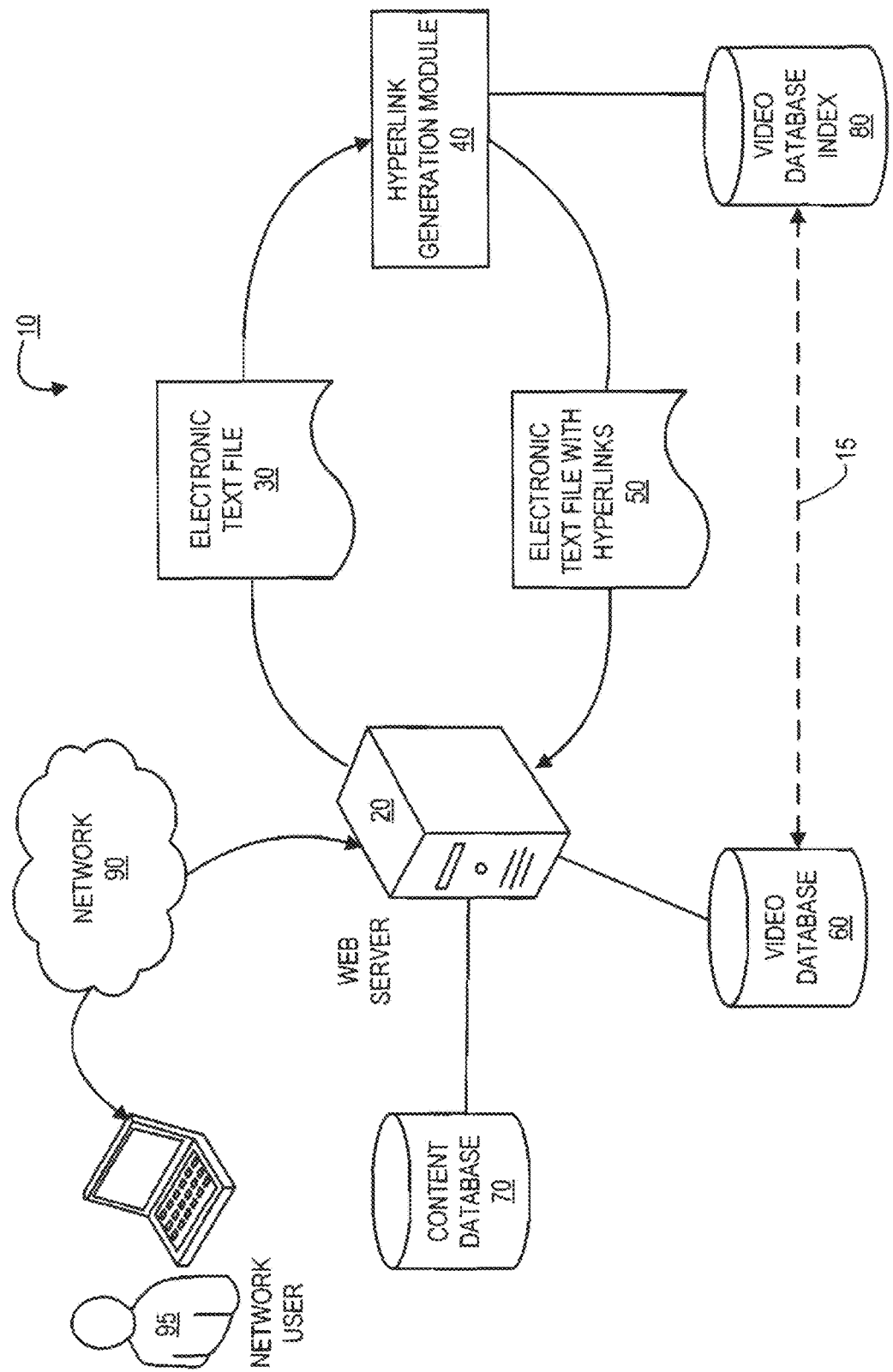
FIG. 1 is a diagrammatic representation of an embodiment of a dynamic hyperlink generation system that automatically generates and inserts hyperlinks into electronic text files to associate multimedia content with the text files.

For the purpose of promoting an understanding of the principles or the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure generally relate to systems and methods for automatically generating and inserting hyperlinks associated with multimedia content into electronic text files based on the content of the text files. Generally, an electronic text file is analyzed to identify keywords within the file. The identified keywords are used to search for and retrieve multimedia content related to the keywords. Typically, the multimedia content is associated with metadata that enables the searching and retrieval of specific types of content. Once retrieved, the multimedia content is associated with one or more keywords to generate a hyperlink between the content and keywords. After it is generated, the hyperlink is inserted into the electronic text file at the appropriate keyword location to create a link to the retrieved multimedia content. Preferably, the generated hyperlinks create links to multimedia content that is contextually relevant to the content of the electronic text files. This process of dynamically generating and inserting hyperlinks into text files enables efficient creation of hyperlinks for vast amounts of content on a recurring basis and/or on the fly as new multimedia content and/or electronic text files become available.

Referring now to the drawings, FIG. 1 is a diagrammatic representation of an embodiment of a dynamic hyperlink generation system 10 that automatically generates and inserts hyperlinks into electronic text files to associate multimedia content with the text files. For exemplary purposes and for ease of reference, the embodiment shown in FIG. 1 (and referenced in other parts of this disclosure) represents a system 10 for linking video files with electronic text files. As will be understood and appreciated by one of ordinary skill in the art, however, other types of multimedia content (e.g. audio files, websites, digital images, etc.) are also linked to electronic text files according to various other embodiments of the present system, and the present system is in no way limited to creation of hyperlinks that link to videos. In the embodiment shown, the system 10 includes a web server 20, to hyperlink generation module 40, a video database 60, a content database 70, and a video database index 80. The system 10 also includes a connection to one or more viewers or users 95 via a network 90 (e.g. the Internet). As will be understood, although the embodiment of the system 10 shown in FIG. 1 includes only one of each of a web server, video database, content database, video database index, and hyperlink generation module, other embodiments of the present system include a plurality of each of these components. As will also be understood, according to one embodiment, the content database 70, video database 60, and video database index 80 are merged into a single database.

According to one embodiment, the web server 20 hosts data content, such as web pages including electronic text files 30. Although the server shown in FIG. 1 represents a web server for hosting Internet activity, embodiments of the present system are not limited to such servers, and other servers (e.g. general-purpose servers within a networked environment) are used according to various embodiments of the present system. Examples of electronic text files 30 include, but are not limited to, electronic documents, news and other content-related articles, blog postings, message board postings, threaded discussions, emails, or any other text-based, computer-readable file. Generally, each electronic text file 30 within the system 10 comprises a Hyper-Text Markup Language (HTML) file, an Extensible Hyper-Text Markup Language (XHTML) file, an Extensible Markup Language (XML) file, or some other similar file type as will occur to one of ordinary skill in the art. In a preferred embodiment, the electronic text files comprise HTML, files that are hosted and displayed on a website to Internet users 95 via the web server 20 and network 90.

In the embodiment shown in FIG. 1, electronic text files 30 are stored in the content database 70 for subsequent use. To initiate the dynamic hyperlink creation and insertion process as described herein, a given electronic text file 30 is retrieved from the content database 70 by the web server 20 and provided to the hyperlink generation module 40. At this stage, the text file generally does not include any hyperlinks, although some text files may include manually-coded hyperlinks, or hyperlinks generated during previous iterations via the hyperlink generation module process 200 (described below). The hyperlink generation module 40 analyzes the electronic text file to identify keywords contained within the file. The keywords are identified and located within the electronic text file via one or more predetermined algorithms, as described in greater detail below. According to one embodiment, the hyperlink generation module 40 comprises a third party component external to the web server system and operated independently and separately from the web server network. According to another embodiment, the hyperlink generation module comprises a component internal to the web server's network.

Once identified, the keywords are used to query the video database index 80 to identify and locate videos that are relevant or germane to the keywords (and, typically, to the overall content, of the electronic text file 30). According to one embodiment of the present system 10, the video database index 80 stores indexed video files that have been pre-associated with metadata related to content in the videos, such as the subjects of the videos, people or actors in the videos, video titles, video creation or publish dates, places described in the videos, or any other desired video content (described in greater detail below). Thus, the hyperlink generation module 40 queries the video database index 80 as a function of the identified keywords to locate videos with metadata identifiers that match or are somehow related to the keywords.

Once the relevant videos have been identified based on the keywords and related metadata, the hyperlink generation module 40 dynamically generates a hyperlink for one or more of the identified keywords in the electronic text file 30, thus providing a link for each keyword to the identified video or videos (described in greater detail below). According to one embodiment, the video database index 80 includes indexed versions of video files (associated with metadata identifiers) that mirror the videos stored in video database 60. Generally, the video database 60 stores the multimedia content associated with a given web server 20. According to one embodiment, as videos are added or removed from video database 60, corresponding updates are made to the video database index 80 via communication link 15. The hyperlink generation module 40 is able to access addresses and locations of videos stored in video database 60 via communication link 15, and thus create pointers to those videos for the generated hyperlink. Once generated, the hyperlinks are inserted into the electronic text file 30 by the hyperlink generation module to transform the text file into an electronic text file with hyperlinks 50.

Still referring to FIG. 1, after the hyperlinks have been inserted, the text file with hyperlinks 50 is returned to the web server 20 where it is made available to users 95, or stored in the content database 70 for subsequent use, or otherwise processed. As mentioned, in one embodiment, the hyperlinks associated with the keywords include pointers that point to videos in the particular web server's 20 video database 60 based on the addresses (i.e. storage locations or identifiers) of those videos in the database. According to one embodiment, when an electronic text file with hyperlinks 50 is made available for viewing by users 95, the identified videos are retrieved from the video database 60 and stored in memory. Thus, if a user clicks on a hyperlink in the text file 50, the system is able to quickly display the associated video (or list of videos) to the user. In another embodiment, rather than storing the videos in memory, an access call is made to the video database 60 to retrieve the associated video(s) each time a user 95 interacts with a hyperlink. Regardless of how identified videos are stored within each embodiment, the present system 10 enables dynamic creation of hyperlinks within electronic text files and display of relevant multimedia content to users based on the content in the text files.

Figure 2:
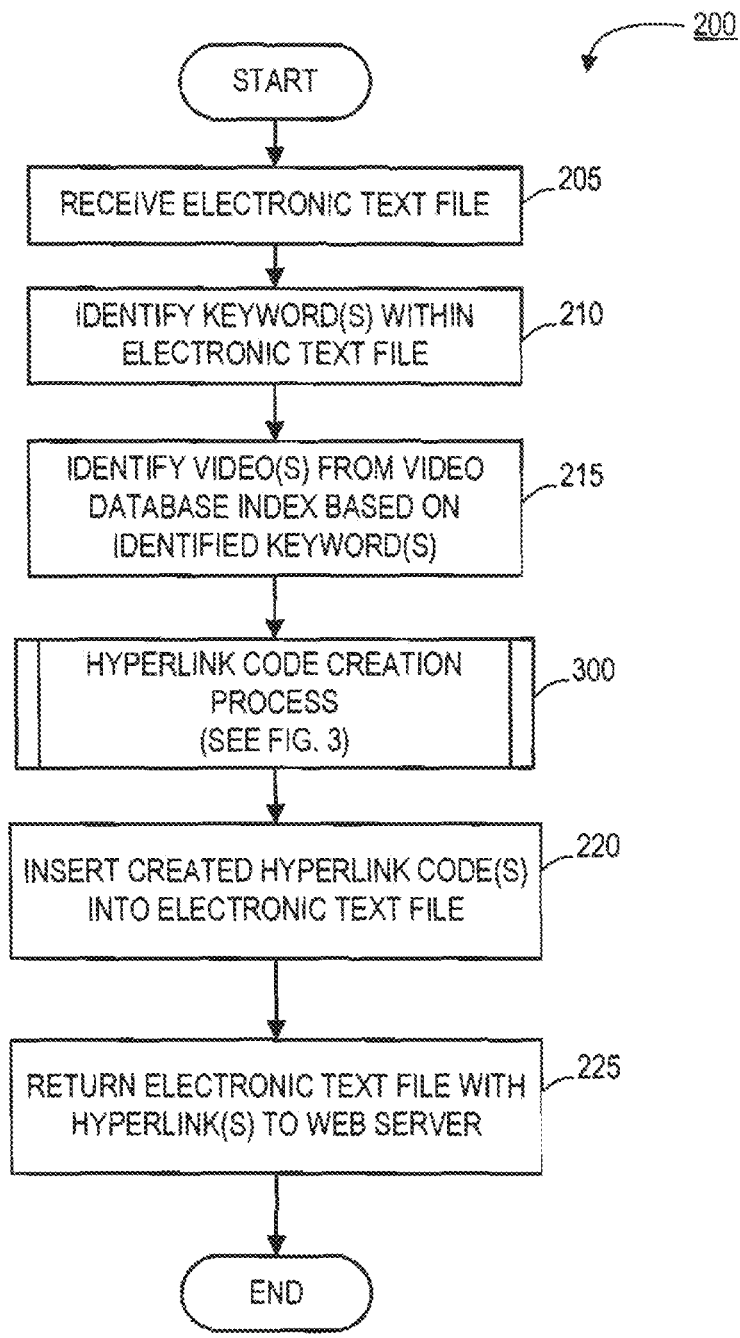
FIG. 2 shows a flow chart demonstrating the steps performed by an embodiment of the hyperlink generation module to dynamically create hyperlinks associated with relevant videos.

Referring now to FIG. 2, a flow chart is shown demonstrating the steps performed by a hyperlink generation module 40 to dynamically create hyperlinks associated with relevant videos according to one embodiment of the present system. Again, as mentioned previously, while exemplary embodiments of the present system are described in relation to hyperlinks associated with video content, hyperlinks are created with other content types according to various other embodiments. Initially, as described above, an electronic text file 30 is received by the hyperlink generation module 40 from a web server 20 (step 205). As will be understood and appreciated, the hyperlink generation process 200 is performed on a looping and continual basis as new electronic text files and/or video content is received by the system 10. Thus, one embodiment of the system repeats process 200 for a new electronic text file each time such a file is created within or received by the system. According to another embodiment, process 200 is repeated for each electronic text file in the system as new video content is received by or created within the system to ensure that the most relevant and up-to-date video content is linked to the text files. Accordingly, in some embodiments, process 200 is performed not only on electronic text files 30, but also on electronic text files with hyperlinks 50 to ensure that hyperlinked video content is relevant and current. As will be understood and appreciated, the hyperlink generation module process 200 may be performed in a variety of ways as desired by a system operator and as will occur to one of ordinary skill in the art.

At step 210 in FIG. 2, the hyperlink generation module 40 identifies one or more keywords within the electronic text file 30. The keywords may relate to virtually any content within the electronic text file, such as names, places, dates, things, action words, acronyms, etc. As will be understood by one having ordinary skill in the art, the keywords may be determined in any number of ways. According to one embodiment of the present system, keywords are predefined by a system operator, and the hyperlink generation module scans the electronic text file via a searching algorithm to determine if any of the keywords in the predefined list of keywords are included in the text file. For example, some system operators may desire only to link particular types of video content to electronic text files, regardless of the subject matter of the text files. Thus, the system operator may define a set of keywords that link to that particular type of video content.

A particularly relevant application of use of predefined keywords is in the marketing or advertising context. For example, an automobile manufacturer may want to display videos (e.g. commercials) related to its products to users 95 based on relevant keywords such as "car", "automobile", "hybrid", "gasoline", etc. Thus, the automobile manufacturer is able to contract with a content provider to generate hyperlinks related to the manufacturer's products each time a predefined keyword appears in the content provider's hosted content (i.e. electronic text files). As will be understood, predefined keywords may be used for other applications not herein described, as will occur to one having ordinary skill in the art.

In another embodiment, keywords are defined and identified through the use of Natural Language Processing (NLP) of the text. In general, NLP systems convert samples of human language into more formal representations that are easier for computer programs to manipulate. According to one embodiment, the NLP system comprises a form of "computational linguistics," which includes the statistical and/or rule-based modeling of natural language from a computational perspective. For example, one embodiment of the present system uses a tf-idf (term frequency-inverse document frequency) weighting to evaluate how important or relevant a term or word is to an electronic text file or collection or text files. The number of times a term occurs in an electronic text file or document is called its "term frequency". However, because many words are common (e.g. "the", "for", etc.), simply using words with the highest term frequency as the keywords will incorrectly emphasize common words. Hence, an "inverse document frequency" factor is incorporated that diminishes the weight of terms that occur very frequently in the text file or collection of files and increases the weight of terms that occur less frequently. Accordingly, one embodiment of the present system utilizes a searching algorithm (e.g. a contextualizer screen) to analyze all words in an electronic text file 30 and determine the tf-idf weighting for each word. Words that have tf-idf weightings above a predetermined threshold are defined as the keywords for the particular text file. Further examples and explanations of tf-idf processes are described in Salton, G. and Buckley, C., *Term-Weighting Approaches in Automatic Text Retrieval*, Information Processing and Management 24 (5), pp. 513-23 (1988), which is incorporated herein by reference as if set forth herein in its entirety. As will be understood and appreciated, various forms of NLP and tf-idf weighting are used according to various embodiments of the present system 10.

According to a preferred embodiment. NLP is used in combination with lists of predefined terms to determine keywords based on relevant or recent topics, news stones, etc. The keywords are determined by a keyword generation algorithm that spiders the Internet and collects a sampling of news articles and other related content, and then extracts popular names and/or topics from the collected set. The extracted names and topics are used to define a predetermined list of keywords for keyword identification in electronic text files 30 and subsequent hyperlink generation. According to one embodiment, popular names are extracted based on heuristics (e.g. Mr. President, Mrs. President, etc.) (for further explanation of heuristics, see Pearl, Judea, *Heuristics*, Addison-Wesley Publishers (1984), which is incorporated herein by reference as if set forth herein in its entirety), predefined lists of first and/or last names (e.g. famous names associated with celebrities, political leaders, etc.), and the term frequency of recognized names. Thus, based on these heuristics, predefined lists, and term frequencies, the keyword generation algorithm is able to determine names that are mentioned frequently or are in the news over a predefined time period (e.g. the past few days), and define those names as keywords.

In the preferred embodiment, popular topics are extracted based on N-grams and the term frequency of extracted/recognized N-grams. As will be understood by one of ordinary skill in the art, an N-gram comprises a subsequence of N items from a given sequence. Generally, N-gram models are a type of probabilistic model used for predicting the next item in a sequence. For example, the items in the sequence may be phonemes, syllables, letters, words, base pairs, etc. Preferably, bigrams (sequences of two words) and trigrams (sequences of three words) are used for scanning a content collection. Thus, based on the frequency of phrases in the collection, the keyword generation algorithm identifies popular phrases (i.e. topics) and defines those phrases as keywords (specifically, sequences of trans comprising a keyword set). As will be understood and appreciated, various sizes of N-grams are used according to various embodiments, and the present system is not limited specifically to the use of bigrams and trigrams.

Still referring to FIG. 2, regardless of the method used to define keywords, a searching algorithm is used to scan the electronic text file 30 to identify any keywords that match the defined keywords. After the keywords have been identified, the hyperlink generation module 40 queries the video database index 80 to identify one or more videos associated with those keywords (step 215). According to one embodiment, if many keywords are identified within a given electronic text file, then the system only retrieves videos and creates hyperlinks for a subset of the identified terms (e.g. the ten terms with the highest tf-idf weights) as defined by a system operator. As described previously, in one embodiment, the stored videos are tagged and indexed via metadata identifiers according to content within the videos to enable efficient and scalable searching of all indexed videos based upon the metadata identifiers. The metadata identifiers or attributes are associated with a variety of content elements within the videos, such as people or actors in the videos, objects in the videos, places shown or described in the videos, video scenes, subject matter, etc. Various methods are known for analyzing and associating metadata with videos to enable indexing and searching of the videos, such as those described in U.S. Patent Publication No. 2002/0108112 to Wallace et al., and U.S. Patent Publication No. 2004/0237101 to Davis et al., both of which are incorporated herein, by reference as if set forth herein in their entireties. Alternatively, some videos are tagged with metadata when they are created (e.g. commercials). Thus, in one embodiment, all videos are associated with metadata based on each video's content before the videos can be searched and subsequently linked to electronic text files.

As mentioned, the hyperlink generation module 40 queries the video database index 80 using the identified keywords to identify video files with metadata corresponding to the keywords. Generally, videos are searched for and retrieved separately for each identified keyword (or set of keywords, such as with an N-gram, a first and last name combination, etc.), such that each keyword or keyword set is linked to its respective identified video content. According to one embodiment, of the present system, the hyperlink generation module searches for and retrieves videos as a function of predefined system settings as defined by a system operator. For example, one aspect of the system simply retrieves all videos that have one or more of the identified keywords in the title of each video. Alternatively, another aspect only retrieves videos with actor- or person-related metadata that matches keyword names identified in text files. Still a further aspect retrieves videos associated with metadata identifiers that match all the keywords in a given electronic text file, or some predetermined percentage of the identified keywords. As will be understood by one of skill in the art, the method in which a video or videos are retrieved for inclusion in a hyperlink may be varied as desired by a system operator. Preferably, because keywords are generally related to the overall content of an electronic text file 30, it is assumed that retrieved videos are also so related, and a user 95 viewing the text file will have an interest in the related video content.

Still referring to FIG. 2, once the video files have been identified or selected by the hyperlink generation module 40, a hyperlink is automatically created for each keyword corresponding to the retrieved video or videos for that keyword, as described in greater detail below in conjunction with the hyperlink code creation process 300 shown in FIG. 3. To avoid redundancy, some embodiments of the present system 10 only create a hyperlink for the first instance (or some limited number of instances) of each keyword in an electronic text file (e.g. if 100 instances of the name "Obama" are identified in a text file, the system only creates a hyperlink for the first instance or first few instances). Once generated, each hyperlink (i.e. the program code associated with each hyperlink) is inserted into the electronic text file at its appropriate keyword location (step 220). Generally, hyperlinks are written in the same programming language as is the electronic text file. For example, in a preferred embodiment, because electronic text files comprise HTML format, hyperlinks are also written in such format. After all hyperlinks have been inserted, the electronic text file 30 is thereby transformed into an electronic text file with hyperlinks 50, and is returned to the web server 20 for display to users 95 or for other subsequent use (step 225).

Figure 3:
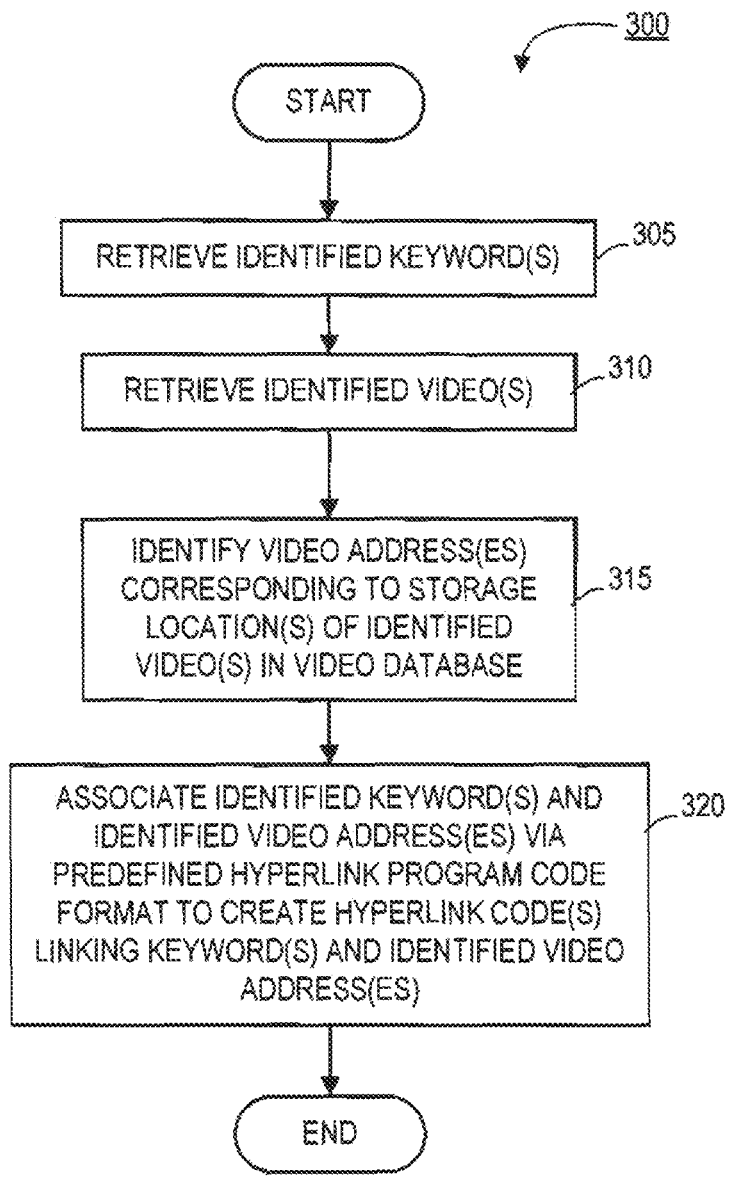
FIG. 3 is a flowchart illustrating the steps associated with one embodiment of the hyperlink creation process.

FIG. 3 is a flowchart illustrating the steps associated with one embodiment of the hyperlink code creation process 300. The steps illustrated in process 300 are performed for each keyword and video(s) combination identified via process 200. As will be understood, according to one embodiment, the steps shown in FIG. 3 are carried out automatically by a computer algorithm such that no manual or human coding is required. Initially, the keywords and videos that were identified during the hyperlink generation module process 200 are retrieved for use in hyperlink creation (steps 305, 310). At step 315, the system identifies the addresses or locations of the identified videos within the video database 60. As mentioned previously, in one embodiment of the present system, the video database index 80 stores indexed and metadata-associated file instances of the videos contained in the video database 60, and the content of both databases is updated correspondingly via communication link 15 as videos are added to or removed from either database. Accordingly, as videos are identified in the video database index 80, the storage addresses or filenames of the corresponding videos in the video database 60 can be obtained by the hyperlink generation module 40 via link 15. These storage addresses, filenames, or other location, identifiers are used to point to the associated video content for each respective hyperlink.

After the location identifiers or addresses have been obtained for each video associated with a given keyword, the keyword (or keyword set) is associated with the identified video address(es) according to a predefined hyperlink program code to create the hyperlink code for the respective keyword (step 320). An exemplary HTML hyperlink code is represented as follows:

<a href="video address">keyword</a> wherein "video address" represents the identified storage location of the video, and keyword represents the respective identified keyword. Once generated, the hyperlink code is inserted into the electronic text file 30 at the appropriate keyword location (discussed above, in reference to step 220 in FIG. 2). As will be understood and appreciated by one of ordinary skill in the art, while an HTML hyperlink code format is shown, the hyperlinks may be configured according to various known methods so long as the hyperlink retrieves and displays the identified and appropriate video content when clicked by a user 95.

Figure 4:
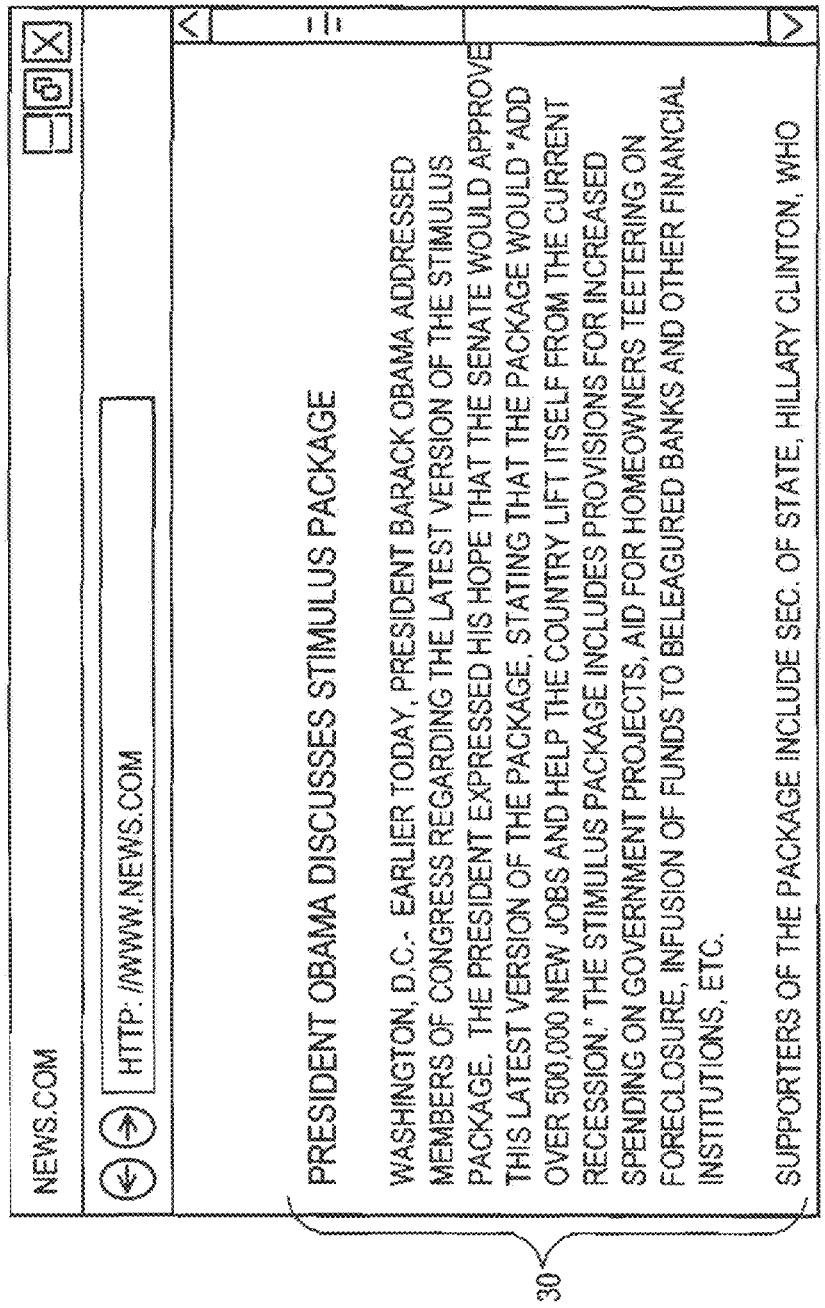
FIG. 4 shows an exemplary terminal display illustrating an exemplary electronic text file displayed via an Internet website according to one embodiment of the present system.

Referring now to FIG. 4, an exemplary terminal display 400 is shown illustrating an exemplary electronic text file 30 displayed via an Internet website. As shown, the exemplary electronic text file comprises a news article discussing a presidential address regarding an economic stimulus package. As mentioned previously, electronic text files 30 may comprise articles, blog postings, threaded discussions, emits, and other similar text-based files. As shown, the electronic text file 30 represented in FIG. 4 includes no hyperlinks, thus indicating it has not yet been processed according to an embodiment of the present system.

Figure 5:
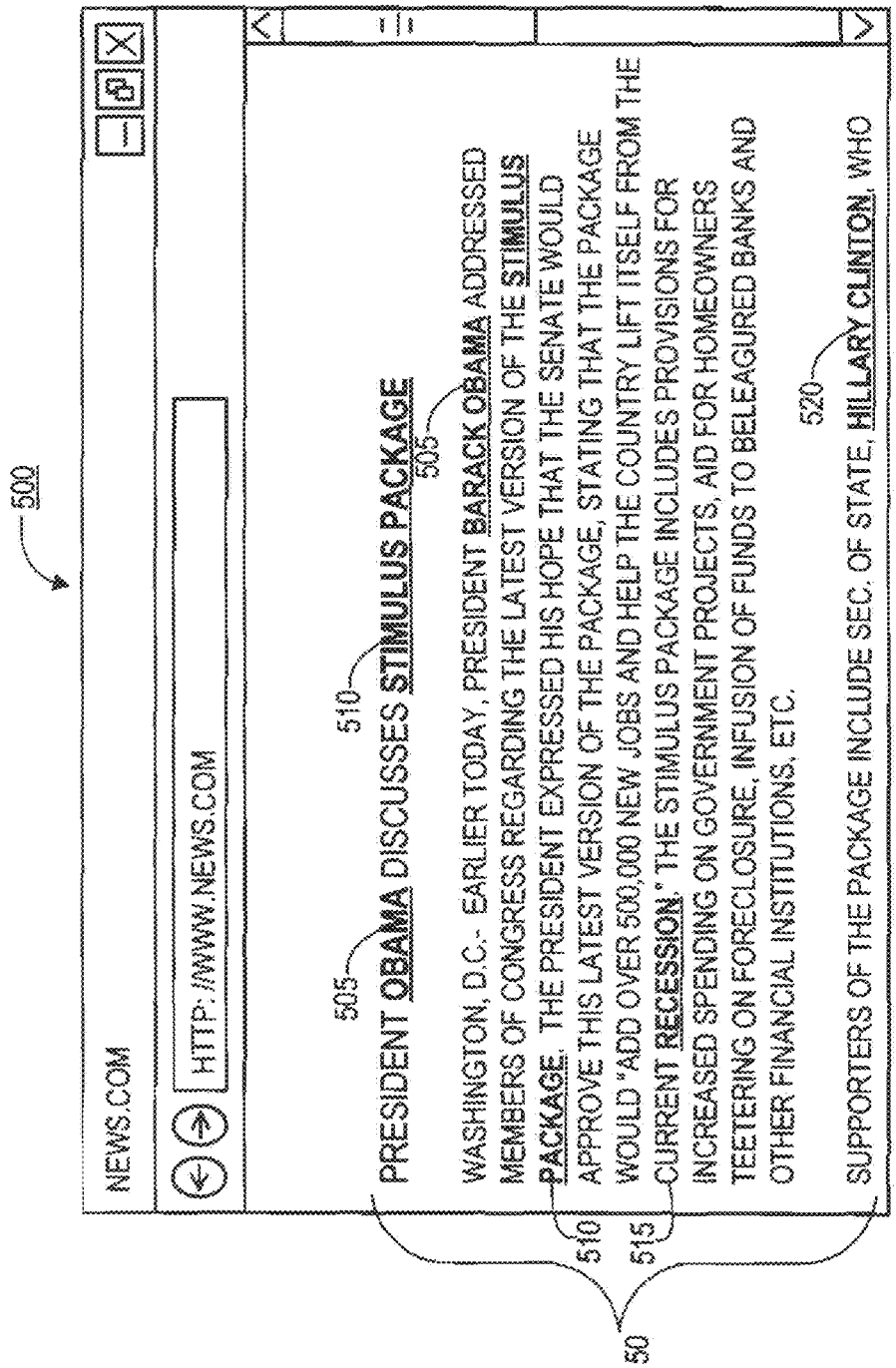
FIG. 5 shows an exemplary terminal display of an exemplary electronic text file with hyperlinks displayed via an Internet website according to one embodiment of the present system.

FIG. 5 shows a terminal display 500 of an exemplary electronic text file with hyperlinks 50 displayed via an Internet website. The text file with hyperlinks shown in FIG. 5 corresponds to the same text file represented in FIG. 4, but at a time subsequent to the file being processed to include dynamically-created hyperlinks associated with identified keywords. As shown, hyperlinks 505, 510, 515, 520 were created and inserted in the text file for the terms "Obama" (and "Barack Obama"), "stimulus package", "recession", and "Hillary Clinton", respectively. These representative hyperlinks were generated and inserted into the text file based on the file's content according to the methods as described previously in connection with FIGS. 2 and 3. As one of ordinary skill in the art will understand, the hyperlinked terms shown in FIG. 5 are presented for illustrative purposes only, and many other terms within the electronic text file could have been selected as keywords and thereby hyperlinked depending upon the predefined attributes of the algorithms or computer programs used to generate the hyperlinks according to a particular embodiment of the present system. Additionally, although the hyperlinked terms are shown in bold and underlined, it will be understood that hyperlinks are represented in a variety of known manners according to various embodiments of the present system.

According to one, embodiment and as described previously, when a user 95 clicks on one of the generated hyperlinks, a video 605, videos, or list of further video hyperlinks 705 is returned that is or are relevant to the particular keyword selected and, preferably, the overall content of the electronic text file 50. If a single video is hyperlinked to the keyword, then, depending on the embodiment, when the hyperlink is clicked by a user 95, that video is displayed via a pop-up window 605 on the website (shown in FIG. 6), or the user is directed to a separate webpage where the video is displayed, or the video is presented according to some other known technique.

Figure 6:
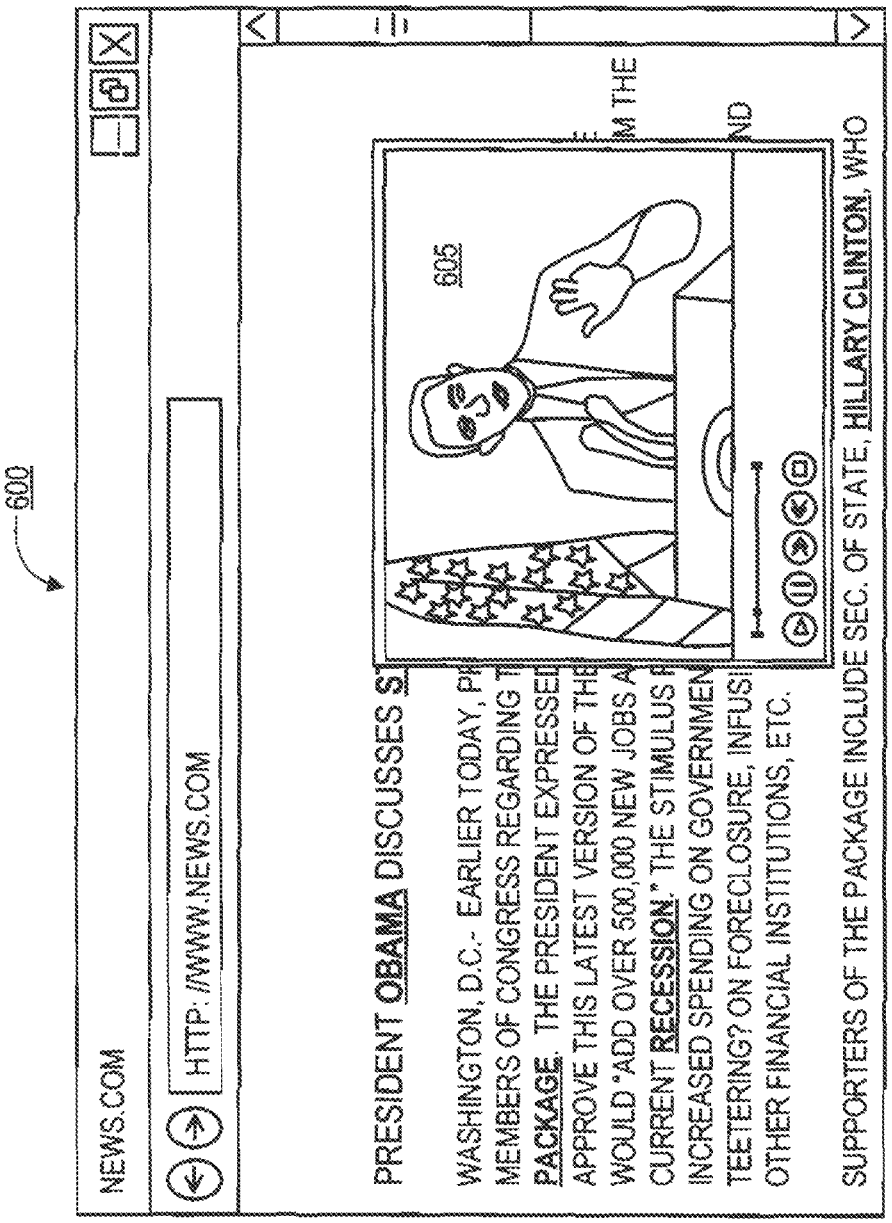
FIG. 6 illustrates an exemplary terminal display of an electronic text file displaying a pop-up video in response to user interaction with a hyperlink in the text file according to one embodiment of the present system.

As shown in FIG. 6, a video of President Obama addressing Congress regarding an economic stimulus package is displayed to a user via a pop-up window 605. The display of this video is in response to the user clicking on one of the hyperlinks in the electronic text file with hyperlinks 50 shown in FIG. 5. As described previously, preferably, the video content is highly-relevant to the text file content. Thus, as shown in FIG. 6, the content of the video (i.e. the President addressing Congress regarding a stimulus package) is contextually related to the content of the text file (i.e. a discussion of the President's address to Congress regarding the stimulus package). As mentioned previously, while videos are preferably contextually related to text file content, embodiments of the present system 10 are able to link multimedia content to keywords based on a variety of desired criteria.

Figure 7:
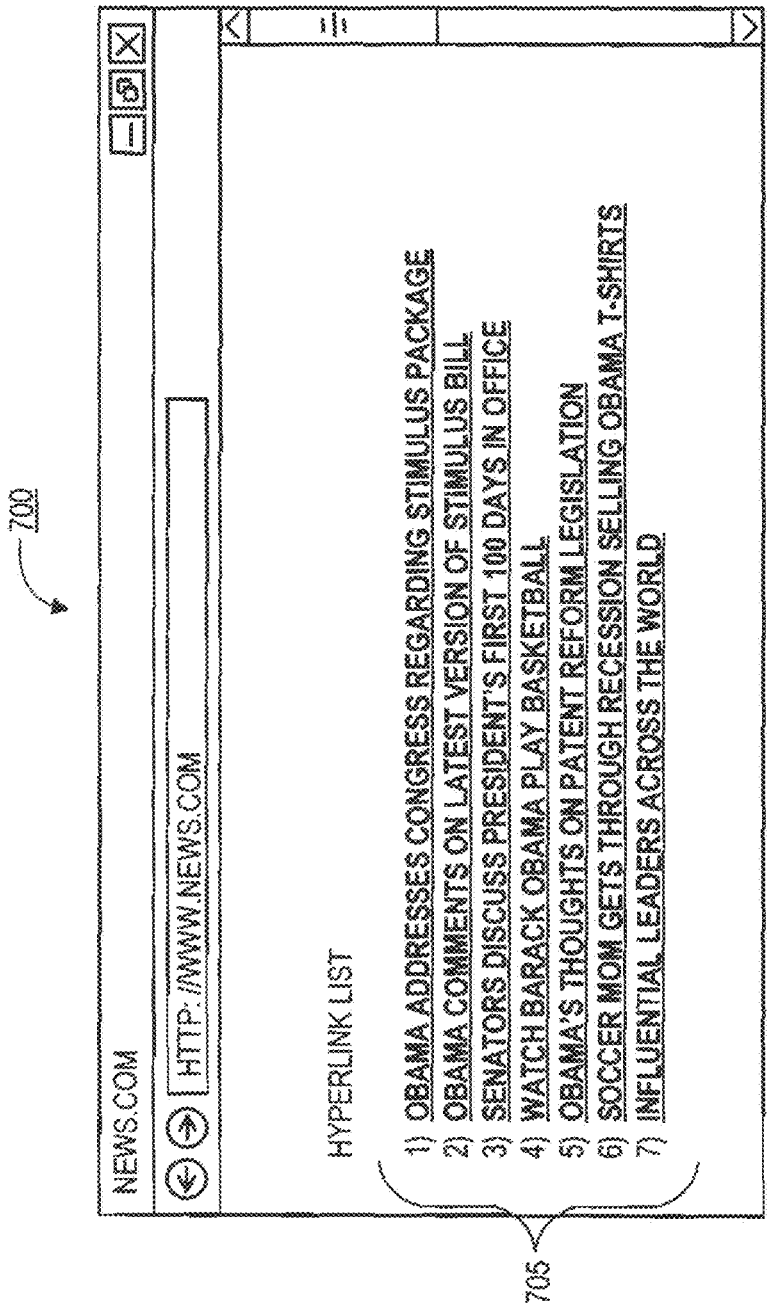
FIG. 7 illustrates a terminal display of an exemplary hyperlink listing according to one embodiment of the present system.

According to another embodiment, rather than displaying a single video, the system displays a list of hyperlinks 705 (i.e. list of links to further videos) in response to user interaction with a keyword hyperlink. FIG. 7 illustrates a terminal display 700 of an exemplary hyperlink listing according to one embodiment of the present system. As will be understood and appreciated, a plurality of videos may apply or be relevant to a single keyword (or keyword phrase/set), and thus a list of those videos is presented to a user in response to the hyperlinked keyword being clicked. Generally, the list 705 includes icons or further clickable links to the videos themselves. Depending on the embodiment, if icons are presented, the icons comprise clickable thumbnail representations of the videos, or short titles of the videos, etc. In one embodiment, each hyperlinked phrase or icon in the list comprises the title of its respective video. As will be understood, the list of hyperlinks 705 may be presented via a pop-up window, or on a separate webpage, etc.

Preferably, if a list of hyperlinks 705 is displayed to a user 95, the hyperlinks are ranked based on their relevance to the content of the electronic text file 50. The exemplary list of hyperlinks shown in FIG. 7 corresponds to the "Obama" or ("Barack Obama") keywords in the electronic text file with hyperlinks 50. Accordingly, as demonstrated by the hyperlink titles associated with the videos, the videos generally include some reference to Barack Obama. However, videos that are related not only to the keyword (i.e. "Obama"), but also to the general context of the text file (i.e. recession, stimulus package, politics, influential leaders, etc.) are displayed as well. Videos that include high relevance to both the keyword and the overall context of the text file are preferably displayed first, so that a user 95 is more likely to view the videos. Videos are deemed highly-relevant to the text file content based on a variety of methods, including ranking videos first that have high percentages of metadata that match extracted keywords from the text file, or simply ranking the most recent (i.e. newest) videos first, etc. As will be understood, videos may be ranked in a variety of manners based on the parameters of a given embodiment of the system.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as, are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method comprising:
receiving, at a server via a network, a request from an electronic device to display a webpage;
accessing, by the server via the network, a list of predefined keywords in response to receiving the request to display the webpage, wherein the list of predefined keywords is generated based on crawling external sources to extract keywords of relevance;
accessing, by the server via the network, the webpage to dynamically identify a relevant keyword on the webpage, wherein the dynamically identified relevant keyword is automatically identified based on one or more of a weight assigned to the relevant keyword or the list of predefined keywords that is generated based on crawling the external sources;
querying, by the server via the network, an external content database server based on the dynamically identified relevant keyword to identify content related to the dynamically identified relevant keyword based on metadata associated with the content, wherein the server is a separate device from the external content database server; and
modifying, by the server via the network, HTML code associated with the webpage such that the dynamically identified relevant keyword is selectable, wherein selection of the dynamically identified relevant keyword causes the electronic device to display a plurality of hyperlinks, wherein selection of a hyperlink, from the plurality of hyperlinks, causes the electronic device to display content of the content related to the dynamically identified relevant keyword associated with the selected hyperlink, wherein the server, the external content database server, and the electronic device are separate and distinct devices.

2. The method of claim 1, wherein, the displaying of the plurality of hyperlinks comprises displaying the plurality of hyperlinks as a pop-up window overlaid over display of the webpage on the electronic device.

3. The method of claim 1, wherein the selection of the dynamically identified relevant keyword causes the electronic device to redirect to another webpage that lists the plurality of hyperlinks.

4. The method of claim 1, wherein the plurality of hyperlinks are associated with a plurality of videos that are contextually related to the dynamically identified relevant keyword.

5. The method of claim 1, further comprising, generating, by the server via the network, an electronic text file and coding the hyperlink into the electronic text file.

6. The method of claim 5, further comprising, ranking, by the server via the network, the each hyperlink of the plurality of hyperlinks, based on their relevance to the content of the electronic text file.

7. The method of claim 6, wherein the each hyperlink of the plurality of hyperlinks is associated with a video; and videos that are relevant to both the dynamically identified relevant keyword and an overall context of the electronic text file are ranked higher than videos that are not relevant to both the dynamically identified relevant keyword and the overall context of the electronic text file.

8. The method of claim 1, wherein displaying the plurality of hyperlinks further comprises displaying a clickable icon for the each hyperlink of the plurality of hyperlinks.

9. The method of claim 8, wherein the clickable icon is displayed as thumbnail representation of a video.

10. The method of claim 4, wherein each video from the plurality of videos are relevant to both the dynamically identified relevant keyword and a context of an electronic text file that includes the dynamically identified relevant keyword.

11. The method of claim 1, further comprising, determining, by the server via the network, relevancy of the dynamically identified relevant keyword based on its contextual relevancy to a content of an electronic text file.

12. The method of claim 1, wherein the weight assigned to the relevant keyword is based on a frequency of appearance of the relevant keyword within the webpage, wherein a relevant keyword with a lesser frequency of appearance is assigned a higher weight than a relevant keyword with a higher frequency of appearance.

13. The method of claim 1, wherein the external sources from which the list of predefined keywords is generated are not previously associated with the webpage.

14. A system comprising:
a memory; and
control circuitry configured to:
receive, at a server via a network, a request from an electronic device to display a webpage;
access, by the server via the network, a list of predefined keywords in response to receiving the request to display the webpage, wherein the list of predefined keywords is generated based on crawling external sources to extract keywords of relevance;
access, by the server via the network, the webpage from the memory to dynamically identify a relevant keyword on the webpage, wherein the dynamically identified relevant keyword is automatically identified based on one or more of a weight assigned to the relevant keyword or the list of predefined keywords that is generated based on crawling the external sources;

query, by the server via the network, an external content database server based on the dynamically identified relevant keyword to identify content related to the dynamically identified relevant keyword based on metadata associated with the content, wherein the server is a separate device from the external content database server;

modify, by the server via the network, HTML code associated with the webpage such that the dynamically identified relevant keyword is selectable, wherein selection of the dynamically identified relevant keyword causes the electronic device to display a plurality of hyperlinks, wherein selection of a hyperlink, from the plurality of hyperlinks, causes the electronic device to display content of the content related to the dynamically identified relevant keyword associated with the selected hyperlink, wherein the server, the external content database server, and the electronic device are separate and distinct devices.

15. The system of claim 14, wherein, the displaying of the plurality of hyperlinks comprises, the control circuitry configured to display the plurality of hyperlinks as a pop-up window overlaid over display of the webpage on the electronic device.

16. The system of claim 14, wherein the selection of the dynamically identified relevant keyword causes the electronic device to redirect to another webpage that lists the plurality of hyperlinks.

17. The system of claim 14, further comprising, the control circuitry configured to generate, by the server via the network, an electronic text file and coding the hyperlink into the electronic text file.

18. The system of claim 17, further comprising, ranking, by the server via the network, the each hyperlink of the plurality of hyperlinks, based on their relevance to content of the electronic text file.

19. The system of claim 18, wherein, the each hyperlink is associated with a video; and videos that are relevant to both the dynamically identified relevant keyword and an overall context of the electronic text file are ranked higher by the control circuitry than videos that are not relevant to both the dynamically identified relevant keyword and the overall context of the electronic text file.

20. The system of claim 14, further comprising, the control circuitry configured to determine, by the server via the network, relevancy of the dynamically identified relevant keyword based on its contextual relevancy to content of an electronic text file.

* * * * *